(12) United States Patent
Toelle et al.

(10) Patent No.: US 7,659,901 B2
(45) Date of Patent: Feb. 9, 2010

(54) APPLICATION PROGRAM INTERFACE FOR PROGRAMMABLE GRAPHICS PIPELINE

(75) Inventors: Michael A. Toelle, Bellevue, WA (US); Craig C. Peeper, Kirkland, WA (US); Brian T. Klamik, Redmond, WA (US); Sam Glassenberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 496 days.

(21) Appl. No.: 11/565,326

(22) Filed: Nov. 30, 2006

(65) Prior Publication Data

US 2008/0018652 A1 Jan. 24, 2008

Related U.S. Application Data

(60) Provisional application No. 60/820,218, filed on Jul. 24, 2006.

(51) Int. Cl.
| | |
|---|---|
| G06T 1/00 | (2006.01) |
| G06T 1/20 | (2006.01) |
| G06F 9/44 | (2006.01) |
| G06F 3/00 | (2006.01) |
| G06F 15/00 | (2006.01) |
| G06F 15/76 | (2006.01) |

(52) U.S. Cl. ................ 345/506; 345/522; 345/520; 345/501; 717/114; 717/162; 717/127; 717/131; 719/321; 719/328; 719/331; 712/17; 712/28; 712/36

(58) Field of Classification Search ............... 345/418, 345/501, 506, 520, 522, 505; 719/316, 320–21, 719/328, 324, 330–331, 327; 712/28–29, 712/220, 16–18, 25, 36, 38, 200–201, 241; 717/101, 114, 120–121, 126–127, 131, 124, 717/151, 154, 162, 165
See application file for complete search history.

(56) References Cited

U.S. PATENT DOCUMENTS

| | | | | |
|---|---|---|---|---|
| 2003/0234791 | A1* | 12/2003 | Boyd et al. | 345/582 |
| 2006/0279577 | A1* | 12/2006 | Bakalash et al. | 345/502 |
| 2007/0250728 | A1* | 10/2007 | Riach et al. | 713/322 |
| 2007/0291044 | A1* | 12/2007 | Xu et al. | 345/582 |
| 2008/0122856 | A1* | 5/2008 | Boyd et al. | 345/582 |

* cited by examiner

*Primary Examiner*—Wesner Sajous
(74) *Attorney, Agent, or Firm*—Shook Hardy & Bacon L.L.P.

(57) ABSTRACT

Systems and methods that optimize GPU processing by front loading activities from a set time/binding time to creation time via enhancements to an API that configures the GPU. Such enhancements to the API include: implementing layering arrangements, employing state objects and view components for data objects; incorporating a pipeline stage linkage/signature, employing a detection mechanism to mitigate error conditions. Such an arrangement enables front loading of the work and reduction of associated API calls.

19 Claims, 11 Drawing Sheets

APPLICATION PROGRAM INTERFACE FOR PROGRAMMABLE GRAPHICS PIPELINE

CROSS REFERENCE TO RELATED APPLICATIONS

This application claims the benefit of U.S. Provisional Application No. 60/820,218 filed on Jul. 24, 2006 entitled "APPLICATION PROGRAM INTERFACE", the entirety of this application is hereby incorporated by reference.

BACKGROUND

Advancement of technology in the world of communications and computing has significantly advanced entertainment systems and enhanced user experiences. In general, entertainment systems strive to realistically recast an environment in which an event or game action occurs. Such trend can also involve recreating the environment based on a user's expectations or desires. Moreover, recent advancements in processing power and transmission capability have made it possible to recreate a realistic setting in relatively small computer enabled systems.

Typically, the entertainment industry offers a variety of passive and interactive forms of settings for amusements, which often are tailored depending on target audience. For example, different video games and television events or programs are specifically marketed to specific life styles, target age groups, and the like. Similarly, head mounted computer displays enable users to experience a graphical environment, wherein a user can enjoy an illusion of presence in the displayed environment. In general, such software for generating virtual reality environments have typically been employed for training and entertaining of personnel, wherein relatively inexpensive computing devices enable 3D virtual reality user interfaces. These 3D virtual reality worlds allow a user to explore a simulated environment. Such environments can further include views from an ordinary street scene with walkways, roads, and buildings to a completely fictitious landscape of an outer space planet. In general, the end goal with virtual reality interfaces still remains to provide the user the most realistic experience possible.

Rendering and displaying 3-D graphics typically involves a plurality of calculations and computations. For example, to render a 3-D object, a set of coordinate points or vertices that define an object to be rendered is initially formed, wherein vertices are subsequently joined to form polygons and define surfaces. Once such defining vertices are formed, a transformation from an object or model frame of reference to a world frame of reference and subsequently to 2-D coordinate is completed. Throughout such procedure, vertices can be rotated, scaled, eliminated or clipped (if they fall outside of a viewable area) lit by various lighting schemes and sources, colorized, and the like. Such processes for rendering and displaying a 3-D object can be computationally intensive and can involve a large number of operations for each vertex.

For example, complexities can arise within the shading process that describes appearance of a material at any point of a 1-D, 2-D or 3-D space, via a function (e.g., procedural shader) in a shading parameter space. In general, the object is "immersed" in the original 1-D, 2-D or 3-D space and the values of shading parameters at a given point of surface are defined as a result of procedural shading function at such point. For instance, procedural shaders that approximate appearance of wood, marble or other natural materials have been developed. Moreover, by passing source code designed to work with a shader into an application, a shader becomes an object that the application can create/utilize in order to facilitate the efficient drawing of complex video graphics—for example, as vertex shaders, geometry shaders, and/or pixel shaders.

Such Vertex, geometry and/or pixel shaders can commonly be implemented wholly as software code, and/or as a combination of more rigid pieces of hardware with software for controlling the hardware. (GPU), which can run on the host CPU. These implementations frequently are contained in a CPU or emulated via employing a system's CPU. For example, hardware implementations can directly integrate a CPU chip, to perform the processing functionality required of shading tasks. Moreover, pixel and vertex shaders can be implemented as specialized and programmable hardware components. Such vertex and pixel shader chips are highly specialized and typically do not behave as prior CPU hardware implementations. Also, GPUs are increasing speed at a faster rate when compared to advancements in CPUs. Accordingly, GPU performance is desired to be decoupled from CPU performance.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation provides for systems and methods that optimize GPU processing by front loading activities from a set time (or binding time) to creation time, via enhancements to an API that configures the GPU. Such enhancements to the API include: implementing layering arrangements, employing state objects and view components for data objects; and incorporating a pipeline stage linkage/signature. Accordingly, an application can designate system resources at creation time (as opposed to at bind time), wherein activities (such as state/parameter validation, creating texture headers, creation points mapping to hardware state registers and the like) are moved to a less frequent path in processing, wherein actual set can be performed rapidly.

The view component supplies a description of how data is laid in memory and how such data can be interpreted by the graphics hardware, (e.g. what format data takes such as integer, floating point; where it is intended to be bound to the pipeline, and the like). In a related aspect, a state object component can create objects upfront (as opposed to manipulating state of the GPU and/or API via a piece meal approach that risks obtaining invalid configurations). Moreover, performance costs associated with operation of computational units within a pipeline are reduced via a linking component that supplies a predefined order (e.g., bind by position—as opposed to a bind by name such as a sort, wherein set of functions describe each parameter at set time on the driver via the CPU and declared at the API.) The linking component can encode a string (e.g., signatures) for each parameter, which can further be validated via a de-bug layer as part of a layering arrangement. In addition, an efficient detection mechanism can be supplied to mitigate error conditions (e.g., reducing number of potentially invalid states that occurs within the pipeline) by assigning a monotonically increasing value for a resource, which is incremented every time such resource is bound as an output.

According to a further aspect of the subject innovation a layered run-time can be provided wherein API calls can move through various layers, which provide additional functionality (e.g., linkage validation, traversing strings to ensure that adjacent shaders are passing values expected by the application, and the like.) As such, a de-bug layer can be supplied that in general does not affect the actual behavior of the API, to obtain layer specific interfaces.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
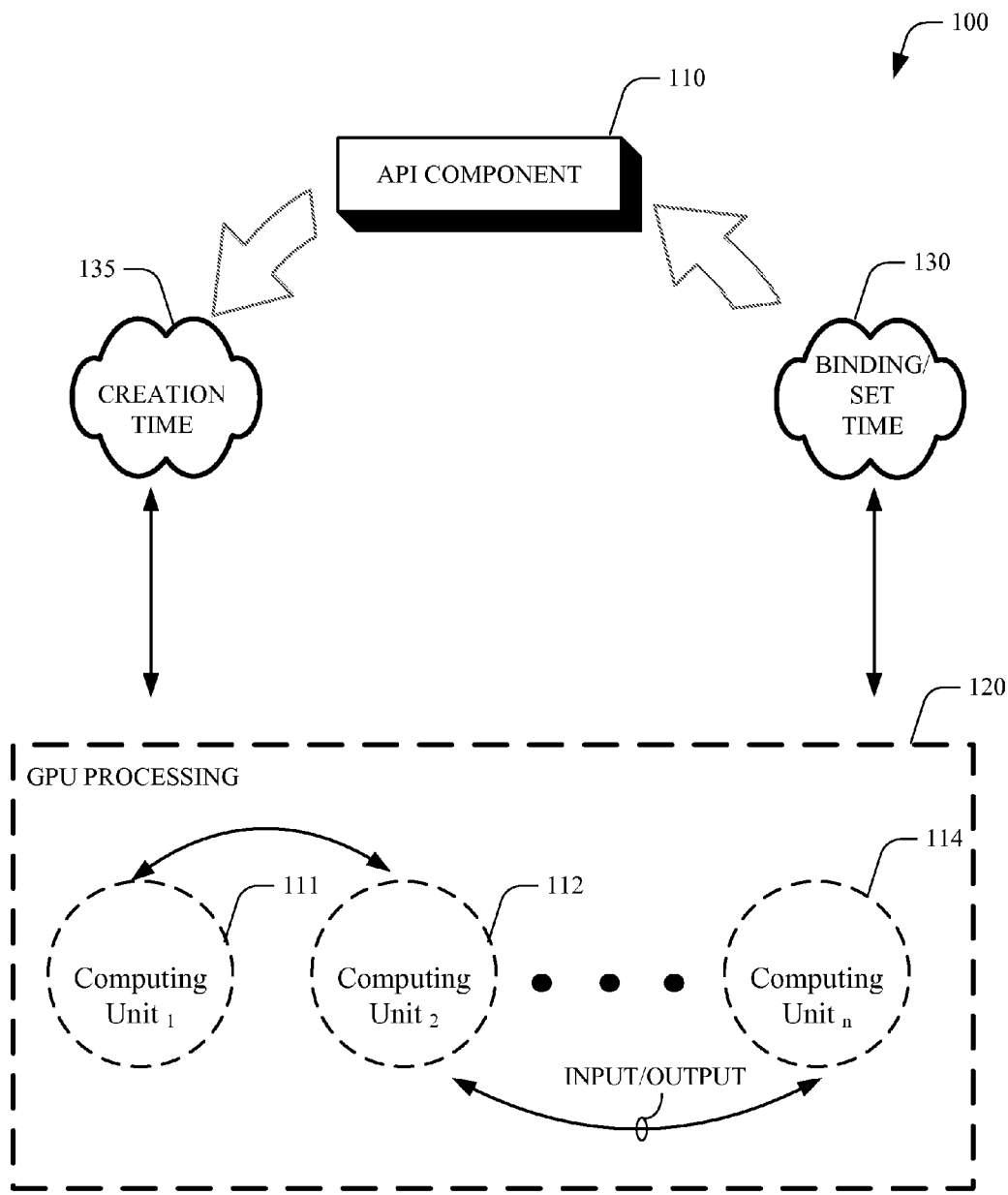
FIG. 1 illustrates a system that implements an API component with enhanced features, and optimizes GPU processing by front loading activities from a set time (or binding time) to creation time, in accordance with an aspect of the subject innovation.

FIG. 1 illustrates a system 100 that optimizes GPU processing 120 by front loading activities from a set time (or binding time) 130 to creation time 135, via enhancement to an API component 110 that configures such GPU processing 120. The API component 110 can configure a hardware pipeline that represents the GPU processing 120, via employing a CPU (not shown) to send down commands to a driver (not shown), and instructing the driver as how to configure the GPU processing 120, (such as setting a state object, send texture to pixel shader, organizing data therebetween, and the like.) Accordingly, an application can designate system resources at creation time 135—as opposed to at bind time 130—wherein activities (such as state/parameter validation, creating texture headers, creation points mapping to hardware state registers and the like) are moved to a less frequent path in processing, and an actual set can be performed rapidly. For example, front loading activities can include, pre-computing a state combination before running the application or prior to rendering, such as creating a state object at application start time, predicting an intended usage and performing computations in advance, to accelerate the usage in the future; creating a view to represent a predetermined usage to facilitate binding, and the like.

In general, the GPU processing 120 can include a plurality of computational units 111, 112, 114 that are positioned within the pipeline to enable operation at various granularity levels (e.g. pixel granularity, vertex granularity, and the like), wherein such computational units can consume data; produce data pass data therebetween. For example and as described in detail infra, data can be passed between shader stages (e.g., from an input assembler to the first shader stage)—such that adjacent stages effectively share a register array. The upstream stage can write data to specific locations in the register array and the downstream stage in generally must read from the same locations. Put differently, the API component 110 can reduce performance costs associated with operation of computational units 111, 112, 114 within the pipeline for GPU processing 120, via front loading activities from the set time (or binding time) 130 to the creation time 135.

Figure 2:
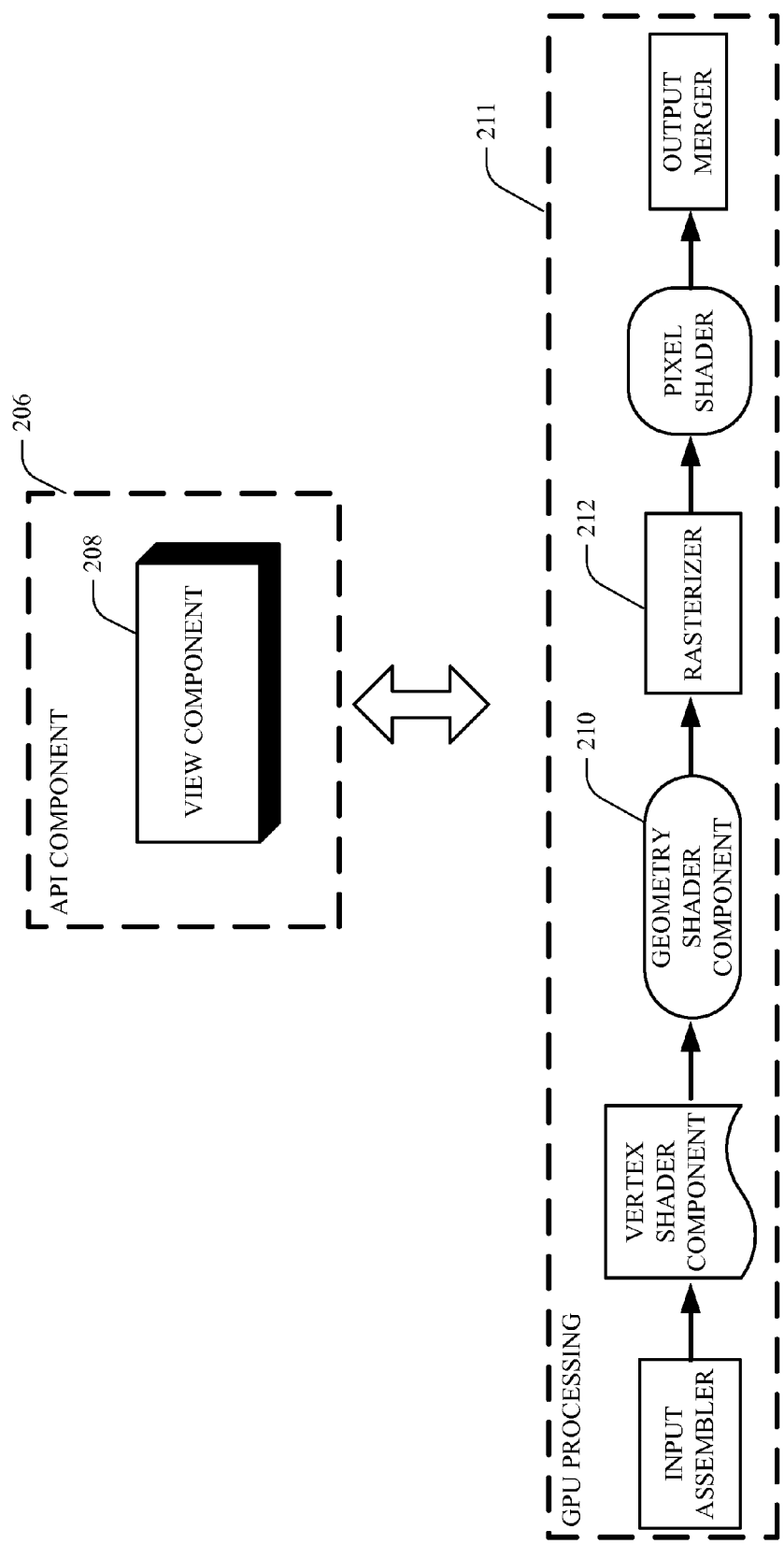
FIG. 2 illustrates a particular enhanced feature for the API component in form of a view component, in accordance with an aspect of the subject innovation.

FIG. 2 illustrates a particular enhanced feature for the API component 206 in form of a view component 208, in accordance with an aspect of the subject innovation. The view component 208 can supply a description of how data is laid in memory and how such data can be interpreted by the graphics hardware, (e.g. what format the data takes such as integer, floating point; where it is intended to be bound to the pipeline, and the like). Hence, such view component 208 can represent an abstraction for binding, wherein the abstraction can inform runtime of driver; how particular resources are to be employed (e.g., descriptors being designated and cached in advance of the bind time, to front load the work and reduce API calls.)

Likewise, such view component 208 can function as lightweight wrappers for data objects, to facilitate a rapidly perform set operation. Accordingly, the view component 208 can function as a mechanism for structural sub-setting of data objects—e.g., given a 2D mipmapped texture data object, a view of a single mipmap level (which is set of arrays representing the same image at progressively lower resolutions) can be created for setting as a shader input resource—while another view of a different mipmap level can be employed as a render target in a same draw call. In addition, such view component 208 can express other resource types as a Texture2Darray-equivalent, in order to enable render target and depth/stencil access to such resources. For example, rendering to a cube map can occur as if it were a 2D texture array of length 6 or less. Moreover, the view component 208 can provide type information for data objects with typeless elements. Such can further enable a single data object to be interpreted with more than one type of the same element size (such as 4 Float 32s or 4 Int32s). In addition, a need for parameter validation can be mitigated during performance of associated functions. It is to be appreciated that any number of views can simultaneously exist for a single data object.

The view component 208 facilitates configuration of the GPU processing 211, which includes a plurality of computational units; such as the geometry shader component 210 that operates on a primitive representing a plurality of vertices data inputs. For example, such primitive can be a simple geometric element (e.g., a point, line, triangle, adjacencies and the like) that forms the building block of more complex geometric structures. The generated primitives can subsequently be sent to a rasterizer 212 for display of associated graphics. Moreover, states for a rasterizer 212 (e.g., rendering states) can be grouped into an object that can be authorized at time of creation (as opposed to at run time), as described in detail infra. Accordingly, a plurality of parameters can be formed as a structure/object that is called at runtime (as opposed to setting individual states for each parameter). Such can mitigate problems associated with overhead and supply an optimized solution. For example, the subject innovation can efficiently configure a pipeline of the GPU processing 211, to provide bind by position wherein linkage and inputs/outputs are defined via locations and/or positions of registers/register banks; (as opposed to bind by name, wherein shaders inputs and outputs are defined by names and a comparison of names is typically required across shader units, to determine how data is to be passed in the hardware.)

An exemplary syntax for a view creation associated with the view component 208 can include;

```
typedef enum D3D10_SRV_DIMENSION
{
    D3D10_SRV_DIMENSION_UNKNOWN = 0,
    D3D10_SRV_DIMENSION_BUFFER = 1,
    D3D10_SRV_DIMENSION_TEXTURE1D = 2,
    D3D10_SRV_DIMENSION_TEXTURE1DARRAY = 3,
    D3D10_SRV_DIMENSION_TEXTURE2D = 4,
    D3D10_SRV_DIMENSION_TEXTURE2DARRAY = 5,
    D3D10_SRV_DIMENSION_TEXTURE2DMS = 6,
    D3D10_SRV_DIMENSION_TEXTURE2DMSARRAY = 7,
    D3D10_SRV_DIMENSION_TEXTURE3D = 8,
    D3D10_SRV_DIMENSION_TEXTURECUBE = 9,
} D3D10_SRV_DIMENSION;
typedef struct D3D10_BUFFER_SRV
{
    SIZE_T ElementOffset;
    SIZE_T ElementWidth;
} D3D10_BUFFER_SRV;
typedef struct D3D10_TEX1D_SRV
{
    UINT MostDetailedMip;
    UINT MipLevels;
    UINT FirstArraySlice;
    UINT ArraySize;
} D3D10_TEX1D_SRV;
typedef struct D3D10_TEX2D_SRV
{
    UINT MostDetailedMip;
    UINT MipLevels;
    UINT FirstArraySlice;
    UINT ArraySize;
} D3D10_TEX2D_SRV;
typedef struct D3D10_TEX3D_SRV
{
    UINT MostDetailedMip;
    UINT MipLevels;
} D3D10_TEX3D_SRV;
typedef struct D3D10_TEXCUBE_SRV
{
    UINT MostDetailedMip;
    UINT MipLevels;
} D3D10_TEXCUBE_SRV;
typedef struct D3D10_SHADER_RESOURCE_VIEW_DESC
{
```

-continued

```
    DXGI_FORMAT Format;
    D3D10_RESOURCE ResourceType;
    union
    {
        D3D10_BUFFER_SRV Buffer;
        D3D10_TEX1D_SRV Texture1D;
        D3D10_TEX2D_SRV Texture2D;
        D3D10_TEX3D_SRV Texture3D;
        D3D10_TEXCUBE_SRV TextureCube;
    };
} D3D10_SHADER_RESOURCE_VIEW_DESC;
HRESULT ID3D10Device::CreateShaderResourceView(
    [ in ] ID3D10Resource* pResource,
    [ in ] CONST D3D10_SHADER_RESOURCE_VIEW_DESC*
    pDesc,
    [ out ] ID3D10ShaderResourceView** ppSRView );
``` wherein pResource can specify the Resource object which the View will interpret, and pDesc contains the immutable information about the View, for example.

Figure 3:
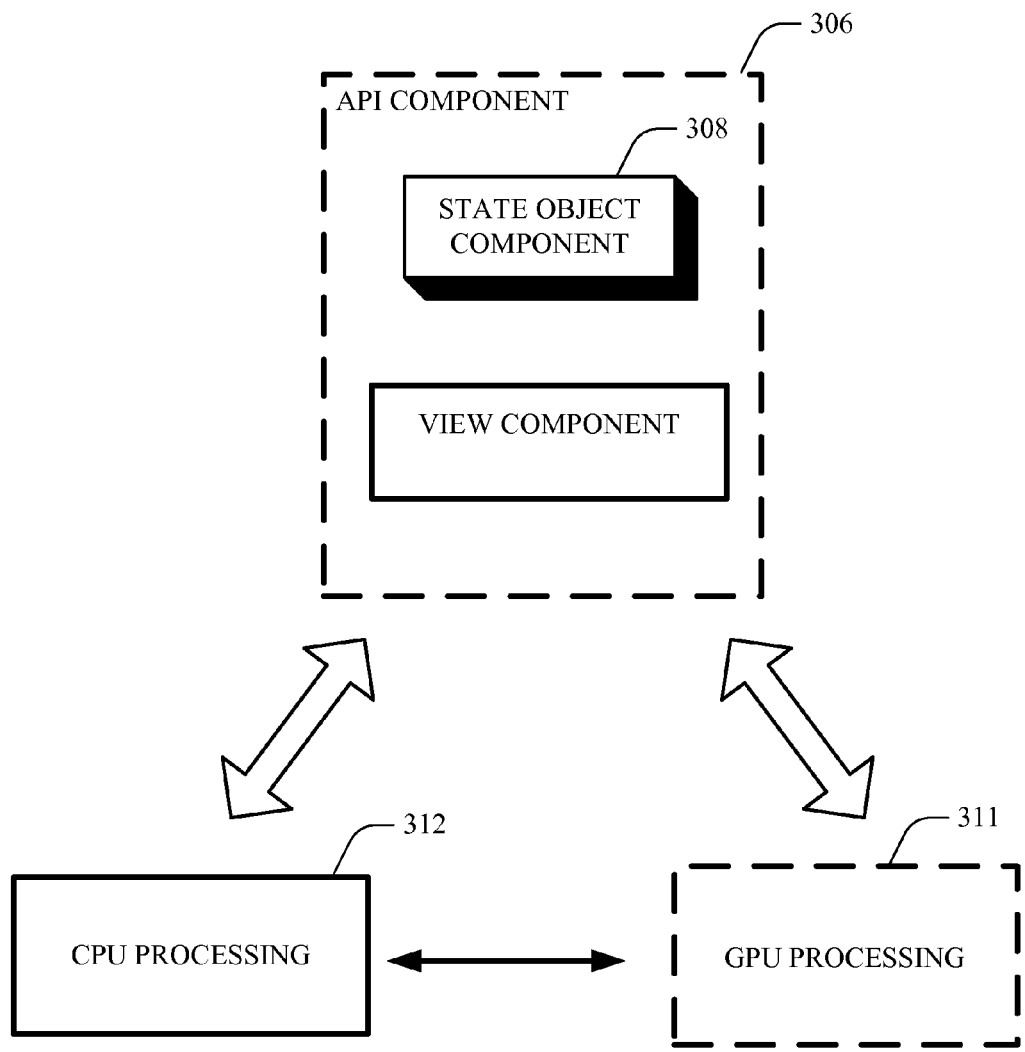
FIG. 3 illustrates another enhanced feature for the API component in form of a state object component, in accordance with an aspect of the subject innovation.

FIG. 3 illustrates another enhanced feature for the API component 306 in form of a state object component 308, in accordance with an aspect of the subject innovation. The hardware pipeline that represents the GPU processing 311 can be configured by the API component 306. For example, the CPU 312 can send down commands to a driver (not shown) and instructing such driver regarding configuration of GPU processing 311 (setting a state object, send texture to pixel shader, organizing data therebetween). The state object component 308 can create objects upfront (as opposed to manipulating state of the GPU 311 and/or API via a piece meal approach that risks obtaining invalid configurations). In general, state objects can be immutable, which simplify runtime and driver operation (by eliminating any object editing requirement), and enable hardware to implement a cache of frequently used objects. For each object type, a large number of object instances can be created, each of which can hold a specific combination of state settings required for the application.

An exemplary syntax for object creation can include:

```
CreateInputLayout
HRESULT CreateInputLayout(
    [ in, size_is(NumElements) ] D3D10_INPUT_ELEMENT_DESC*
    pInputElementDescs,
    [ in ] UINT NumElements,
    [ in ] const void* pShaderBytecodeWithInputSignature,
    [ out ] ID3D10InputLayout** ppInputLayout
);
typedef enum D3D10_INPUT_CLASSIFICATION
{
    D3D10_INPUT_PER_VERTEX_DATA,
    D3D10_INPUT_PER_INSTANCE_DATA
} D3D10_INPUT_CLASSIFICATION;
const UINT D3D10_APPEND_ALIGNED_ELEMENT = 0xffffffff;
typedef struct D3D10_INPUT_ELEMENT_DESC
{
    LPCSTR                      SemanticName;
    UINT                        SemanticIndex;
    DXGI_FORMAT                 Format;
    UINT                        InputSlot;
    UINT                        AlignedByteOffset;
    D3D10_INPUT_CLASSIFICATION  InputSlotClass;
    UINT                        InstanceDataStepRate;
} D3D10_INPUT_ELEMENT_DESC;
``` wherein the "ppInputLayout" can be NULL. As such, the application can request to validate other parameters with validation provided by the run-time, and when all parameters are valid, S_FALSE can be returned (instead of S_OK). Moreover, for any given element's description, if the AlignedByteOffset is set to D3D10_APPEND_ALIGNED_ELEMENT, the offset for such element can be set to the next aligned offset after the previously defined element—(in order of appearance in declaration)—for that input's slot. It is to be appreciated that there can exist multiple slots being defined in a single Input Layout declaration, so such "appending" behavior can be tracked separately for each slot. It is to be appreciated that the subject innovation is not limited to immutable objects, and a function can be exposed that operates on a state object and modifies it, even though a cost may be associated with such operation. Accordingly, mapping can be re-computed to hardware state registers, for a state of the object that is to be changed.

Figure 4:
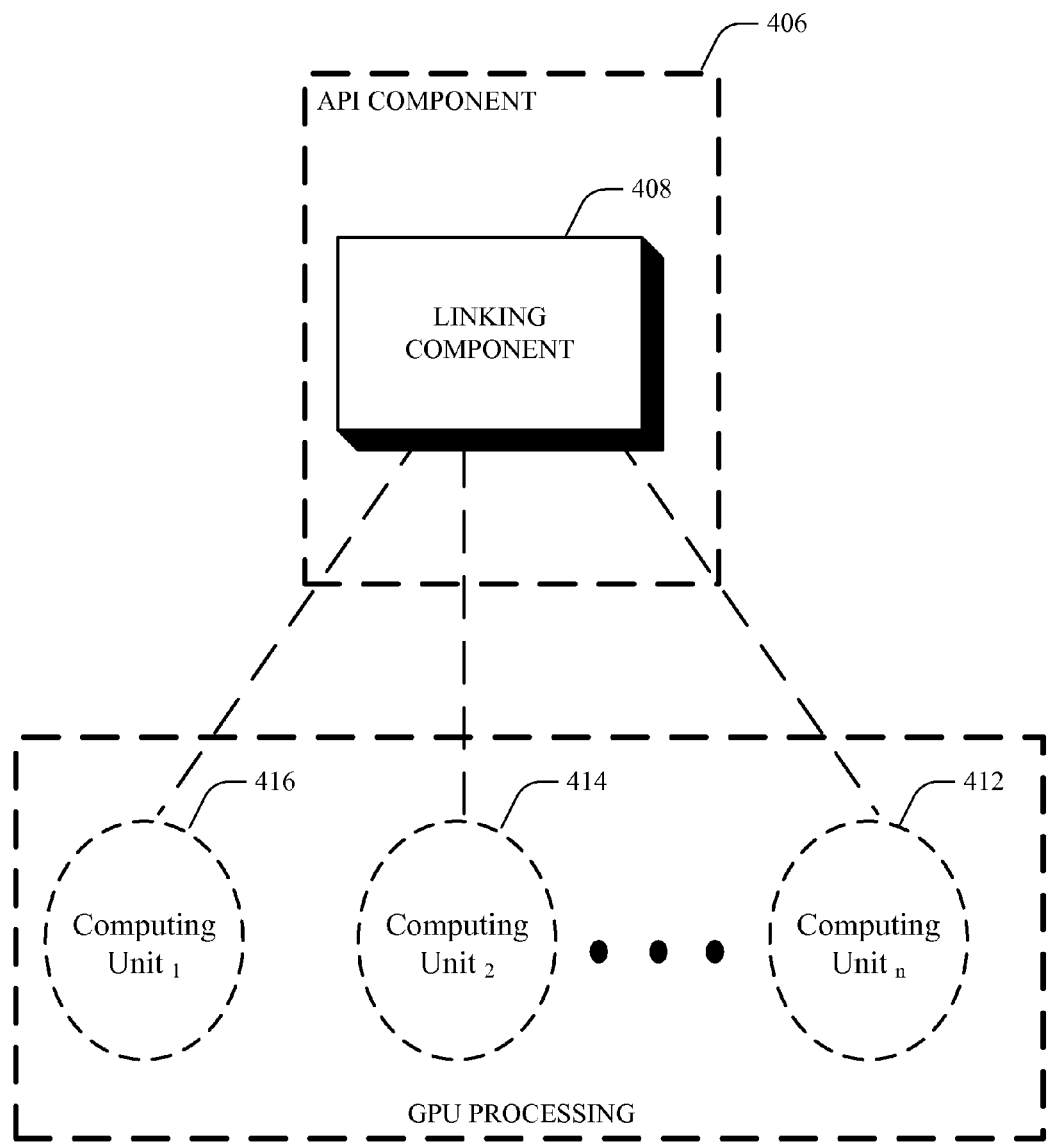
FIG. 4 illustrates a linking component as part of an API of the subject innovation.

FIG. 4 illustrates a particular API component 406 that includes a linking component 408 in accordance with an aspect of the subject innovation. Such linking component 408 can supply a predefined order—(e.g. bind by position, as opposed to a bind by name such as a sort, wherein set of functions describe each parameter at set time on the driver via the CPU and declared at the API component 406), to reduce performance costs associated with operation of computational units 412, 414, 416 within a pipeline.

In general such computational units 412, 414, 416 are positioned within the pipeline to enable operation at various granularity levels (e.g., pixel granularity, vertex granularity, and the like), wherein such computational units can consume data; produce data pass data therebetween. For example, data can be passed between shader stages (e.g., from an input assembler to the first shader stage)—such that adjacent stages effectively share a register array. The upstream stage can write data to specific locations in the register array and the downstream stage in generally must read from the same locations. The linking component 408 can encode a string for each parameter that can be validated via a de-bug layer as part of a layering arrangement, as described in detail infra. For example, the API mechanism for the upstream stage and downstream stage can share a common understanding of the linkage register locations (e.g., a 'signature'.) Accordingly, configuration speed can be enhanced and a fix up requirement for corresponding input/out puts for computational units of the pipeline is reduced.

Figure 5:
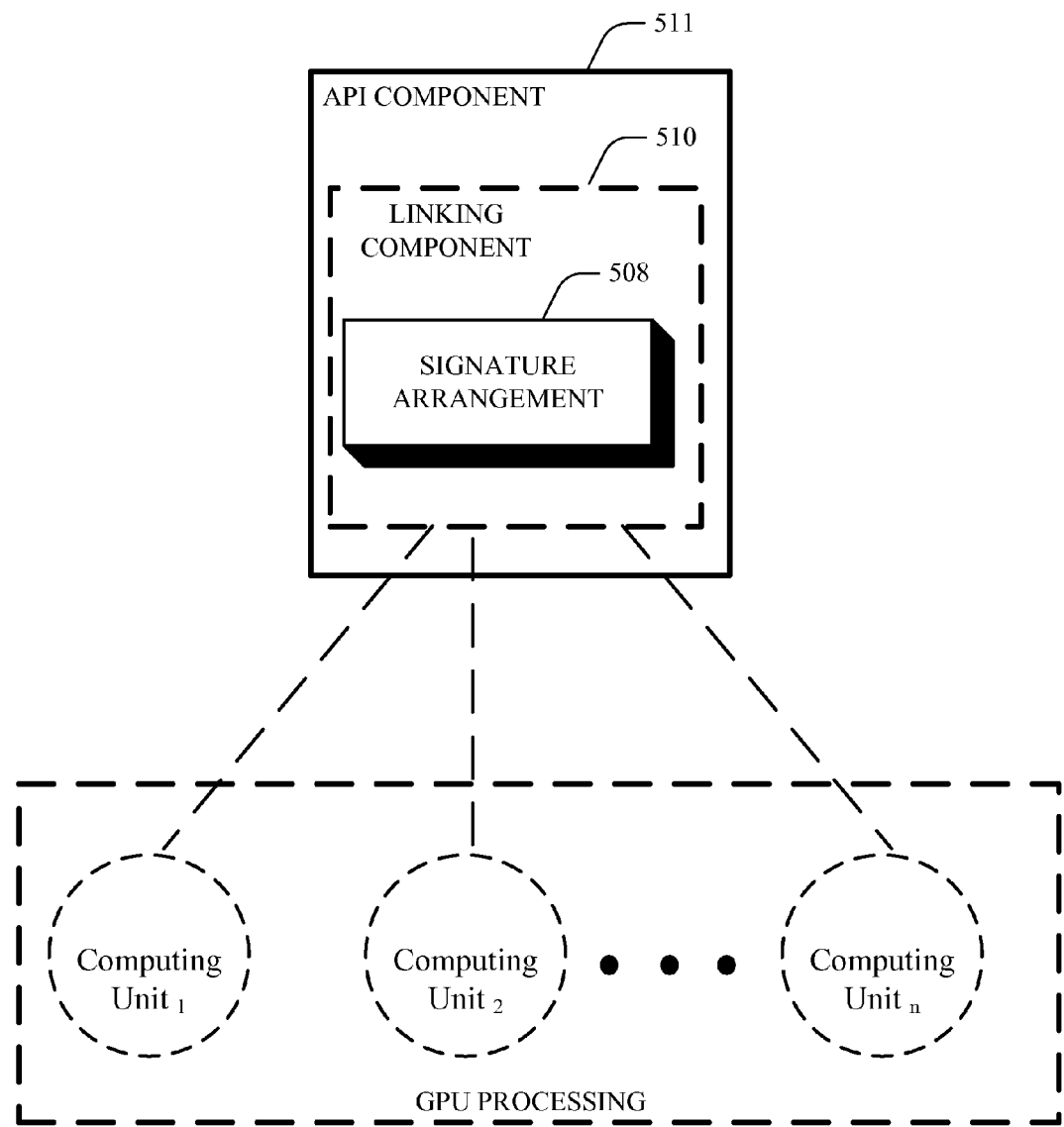
FIG. 5 illustrates a signature arrangement that designates a structure definition in accordance with an aspect of the subject innovation.

FIG. 5 illustrates a signature arrangement 508 as part of a linking component 510, which is further associated with the API component 511. The linking component 510 can encode a string (e.g., signatures) for each parameter that is validated via a de-bug layer—as part of a layering arrangement in accordance with an aspect of the subject innovation. In general, a signature designated by the signature arrangement 508 can designate a structure definition for the (conceptual) register array, which can be employed to pass data between stages. For example, a signature can consist of an ascii string name, component mask, and data type for each element in the array. Moreover, a signature can consist of a range of 1 to 32 name/mask/type definitions (wherein 16 elements can be passed from the input assembler through the geometry shader, and 32 elements from the geometry shader to the pixel shader), for example. Such signatures can also be employed to typically ensure that two adjacent stages agree on how data is being passed therebetween. In one exemplary aspect, system connection points that require signatures are: input assembler→vertex shader; vertex shader→geometry shader; geometry shader→stream output; geometry shader→pixel shader. Moreover, in general signatures are not required for the pixel shader to render target outputs—(although such can be provided for additional validation.) It is to be appreciated that two signatures can be provided for each connection point (one for input, and one for output), which can further be validated to ensure that a match exists.

Signatures can be created during high-level shader language (HLSL) compilation based on the shader declaration, such as the specific names used in the HLSL code for the element names, for example. For connection points that are input-to or output-from a shader, the signature can be embedded in the shader object. Moreover for non-shader connection points (e.g., input assembler, stream output, and render target output) applications can either explicitly create a signature or extract a signature from a shader to use at such points.

Figure 6:
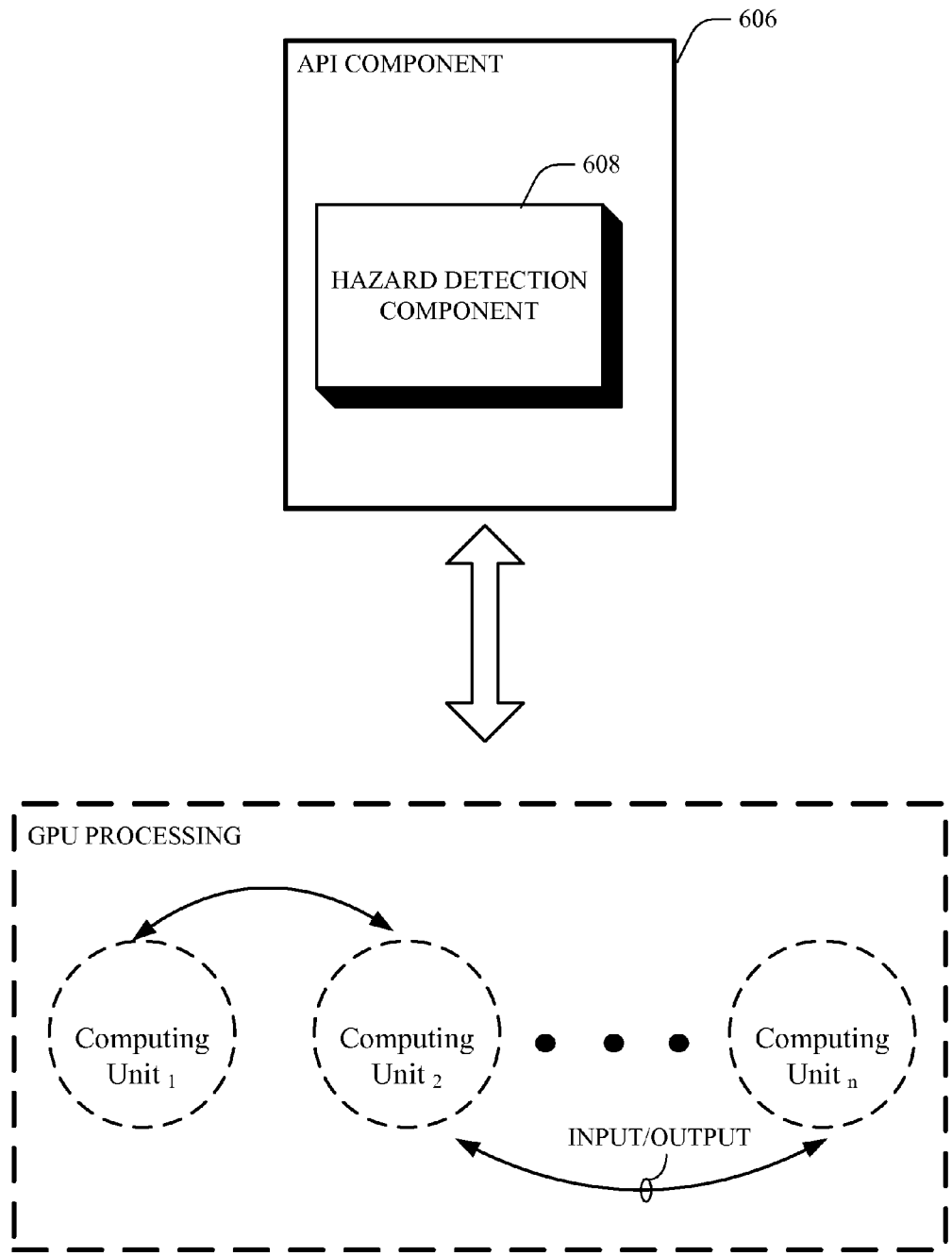
FIG. 6 illustrates a hazard detection component that associates with an API of the subject innovation.

FIG. 6 illustrates a particular API component 606 that includes a hazard detection component 608, in accordance with an aspect of the subject innovation. Such hazard detection component 608 supplies an efficient detection mechanism to mitigate error conditions (e.g., reducing number of potentially invalid states that occur within a pipeline) by assigning a monotonically increasing value for a resource—which is incremented every time such resource is bound as an output. For example, a hazard can be detected when an integer value associated with a view does not match a corresponding integer value associated with a resource, such as a shader resource and output views for the resource. The related driver can then be notified, to avoid binding memory in wrong format to accommodate its usage as output or input. Moreover, such detection identifies a Read-after-Write Hazard on a Resource granularity throughout the usage of a Device Context, wherein such operation can be sent to the driver immediately before the Resource is employed as an input in the graphics pipeline. Moreover, at runtime logic can be provided that filters state objects to determine whether two state objects are logically identical, and if so such identical API objects can be mapped to the same Display Driver Interface (DDI) object. Accordingly, functional equivalency can be determined for various objects for a mapping thereof, to the same internal state object (driver/hardware).

Figure 7:
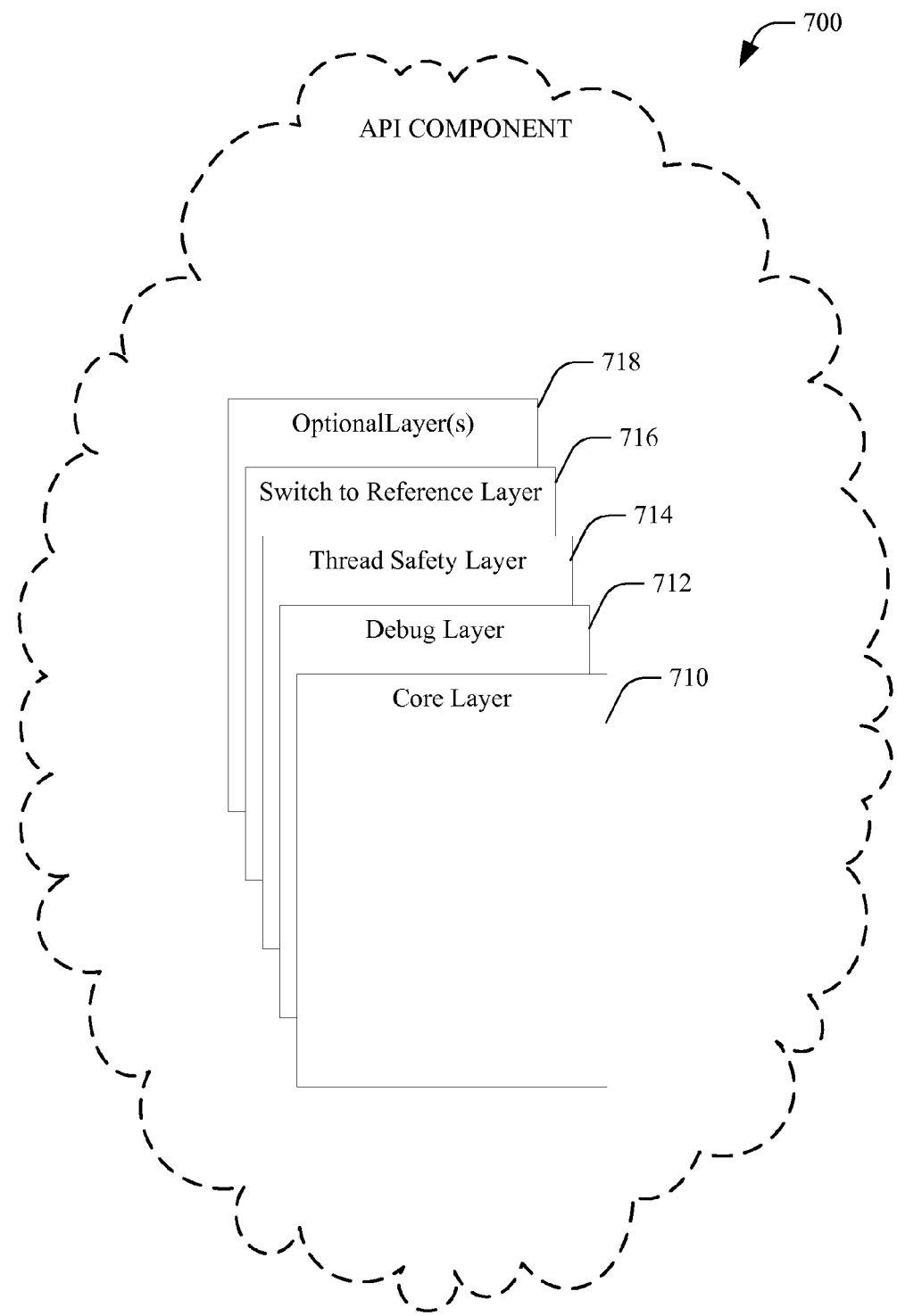
FIG. 7 illustrates a layering arrangement according to a particular aspect of the subject innovation.

FIG. 7 illustrates a layering arrangement that can be employed with an API that creates objects upfront in accordance with an aspect of the subject innovation. Accordingly, components for the API of the subject innovation can be implemented in a layered arrangement, to provide device-wide additional functionality. Such layered arrangement can include a core layer 710 (to transform the API to a DDI that interacts with the driver), a debug layer 712 (which is located between the core layer and an application, to determine common developer errors,) a thread safely layer which enables the application to query and configure synchronization primitives 714, a switch to reference layer 716 that enables moving all the device state to a reference device (being implemented in software), and other optional layers 718 that can be incrementally added (e.g. plug-in infrastructure—starting with the basic functionality at the core and building optional and developer-assist functionality in outer layers).

In general, the core layer 710 can be incorporated for high-frequency calls, to perform a thin mapping between the API and the user-mode DDI. Put differently, such core layer 710 supplies a thin mapping to the API. Additional optional layers 718 support supplementary validation and other developer aids and tools. In general, layers can be requested at device create time, or in the case of developer tools can be controlled by external means (control panel, registry) and bound at device create time. Typically, and unless a layer specifically introduces behavior changes, the API component 700 behaves identically as layers are added and removed. For example, additional validation performed in the debug layer 712 can find and report issues via a separate error reporting mechanism, and will not alter any function behavior (including return results), for example. The debug layer 712 enables moving validation from run-time to development time and identifies application errors. Conceptually, the ordering of layers can be defined to maximize compatibility and utility between such layers. For example, the thread-safe layer can be positioned near the application, to provide thread-safety for other active layers in use.

In a related aspect, within the multi layering arrangement of the subject innovation, a query can be provided to turn "on" and "off" the thread safety layer 714. Accordingly, thread safety can be employed for a predetermined period (e.g., for multiple threads to load data), and yet turned "off" at runtime when actual rendering occurs (wherein, safety is not required, as rendering can occur from a same thread, for example.) Hence, a balance can be maintained between performance and multithreaded safety, wherein thread safety support can be implemented in an optional layer wrapped around the core API. In general, such layer can be enabled by default, and if not active has no performance impact on single-thread accessed devices.

According to a particular example, a layered run-time can be provided wherein API call can move through various layers, to provide additional functionality (e.g., linkage validation, traversing strings to ensure that adjacent shaders are passing values expected by the application, and the like.) As such, a de-bug layer can be supplied that in general does not affect the actual behavior of the API, to obtain layer specific interfaces.

In a related aspect, handles or pointers for identification of data (which the API communicates to the driver), can be assigned at run-time and/or API assigned—as opposed to handles being driver assigned—wherein the driver can inform how large a region of memory the handle should point to. In general, handles are pointers that are wrapped with a strong type to identify the object being operated on. The value of such pointer can be provided by the runtime. Accordingly, a control of memory allocation can be supplied (e.g., positioning data next to driver data), to enhance memory coherence (as access patterns indicate that this data will be accessed and thus improve performance.

Figure 8:
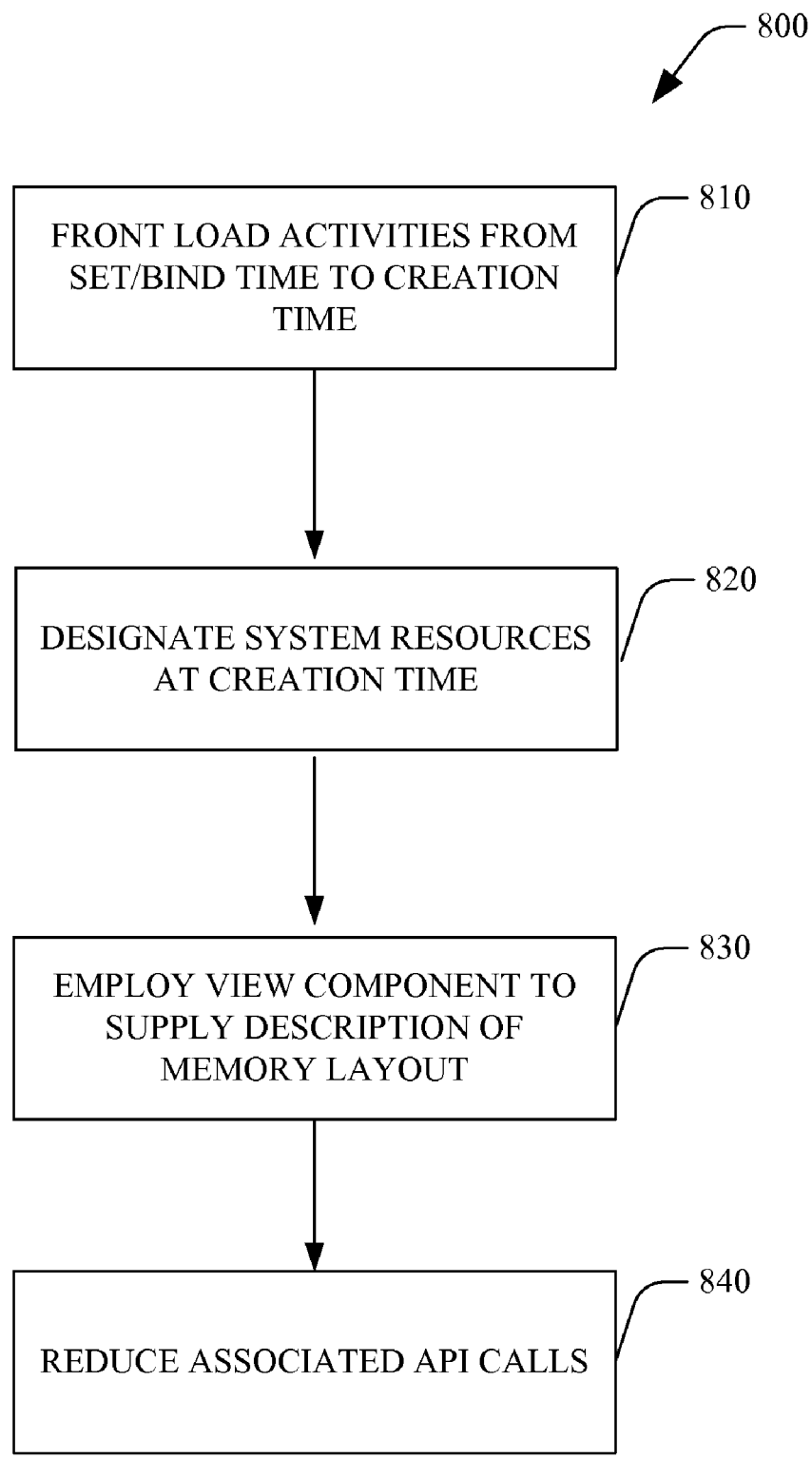
FIG. 8 illustrates a methodology of configuring the GPU to optimize GPU processing.

FIG. 8 illustrates a related methodology of optimizing GPU processing by front loading activities from a set time (or binding time) to creation time, in accordance with an exemplary aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and at 810 activities can be frontloaded from a set/bind time to creation time, as described in detail supra. Next and at 820 system resources can be designated at creation time. At 830, a view component is employed to supply description of memory layout, and/or how such data can be interpreted by the graphics hardware, (e.g., what format the data takes such as integer, floating point; where it is intended to be bound to the pipeline, and the like). By representing an abstraction for binding, (e.g., the abstraction informing runtime of driver how particular resources are to be employed) associated API calls can be reduced at 840. Moreover, typically the application can ensure holding a reference to an object for as long as binding of such object to the pipeline is desired; and hence efficiency of binding can be improved by unbinding from the pipeline as the object is destroyed and the associated reference count becomes zero—e.g., each bind location on the Device object holds a weak-reference to the interface/object.

Figure 9:
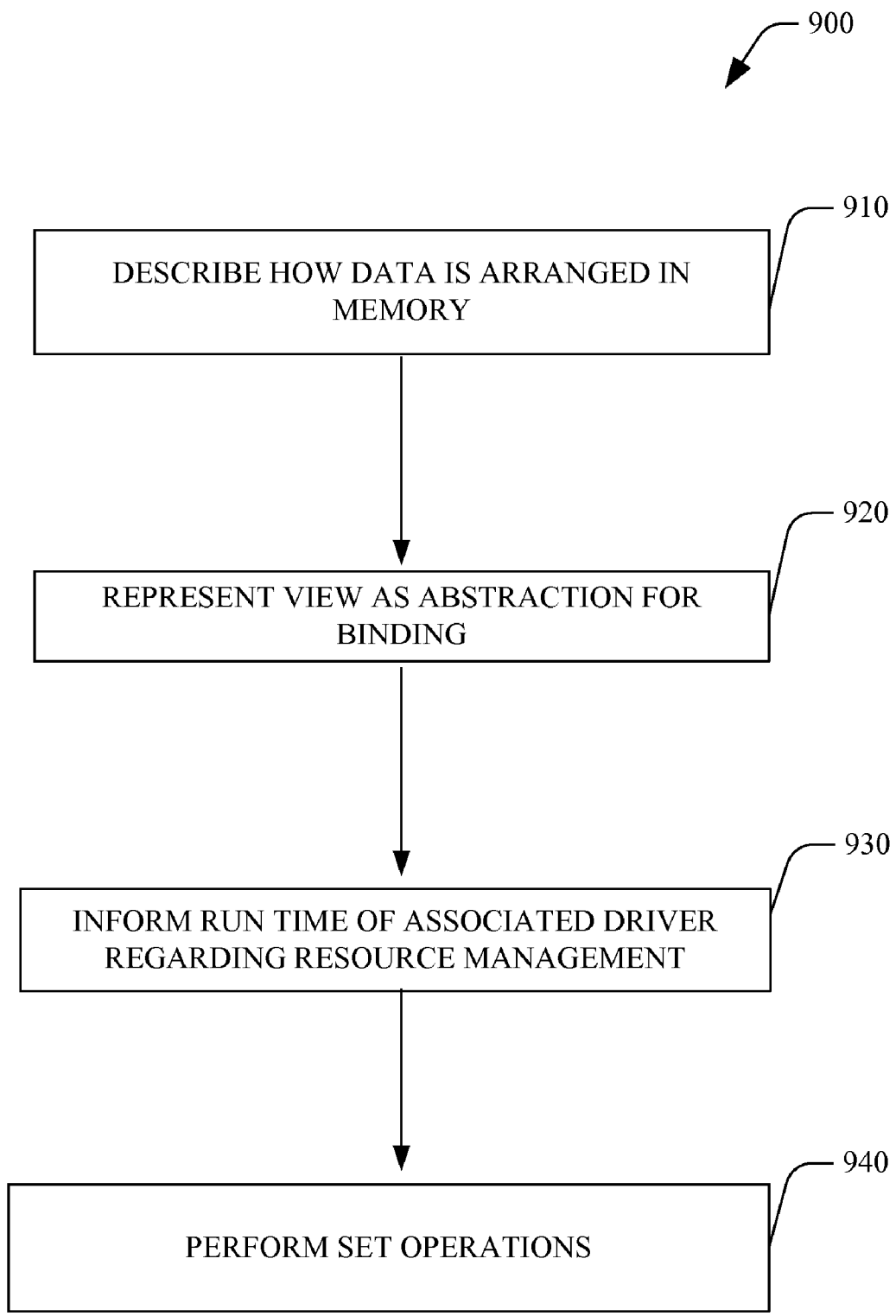
FIG. 9 illustrates a further methodology of employing a view component as part of an API of the subject innovation.

FIG. 9 illustrates a related methodology for rapidly performing a set operation for configuring the GPU in accordance with an aspect of the subject innovation. Initially, and at 910 the view component supplies a description of how data is laid in memory and how such data can be interpreted by the graphics hardware, (e.g., what format the data takes such as integer, floating point; where it is intended to be bound to the pipeline, and the like). Next, and at 920 such view can represent an abstraction for binding, wherein the abstraction can inform runtime of driver how particular resources are to be employed at 930 (e.g., descriptors being designated and cached in advance of the bind time, to front load the work, and API calls reduced.) Subsequently, set operations for GPU processing can be implemented at 940, wherein the application can designate system resources at creation time (as opposed to at bind time), and activities (such as state/parameter validation, creating texture headers, creation points mapping to hardware state registers and the like) are moved to a less frequent path in processing.

As used in herein, the terms "component," "system", "arrangement" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
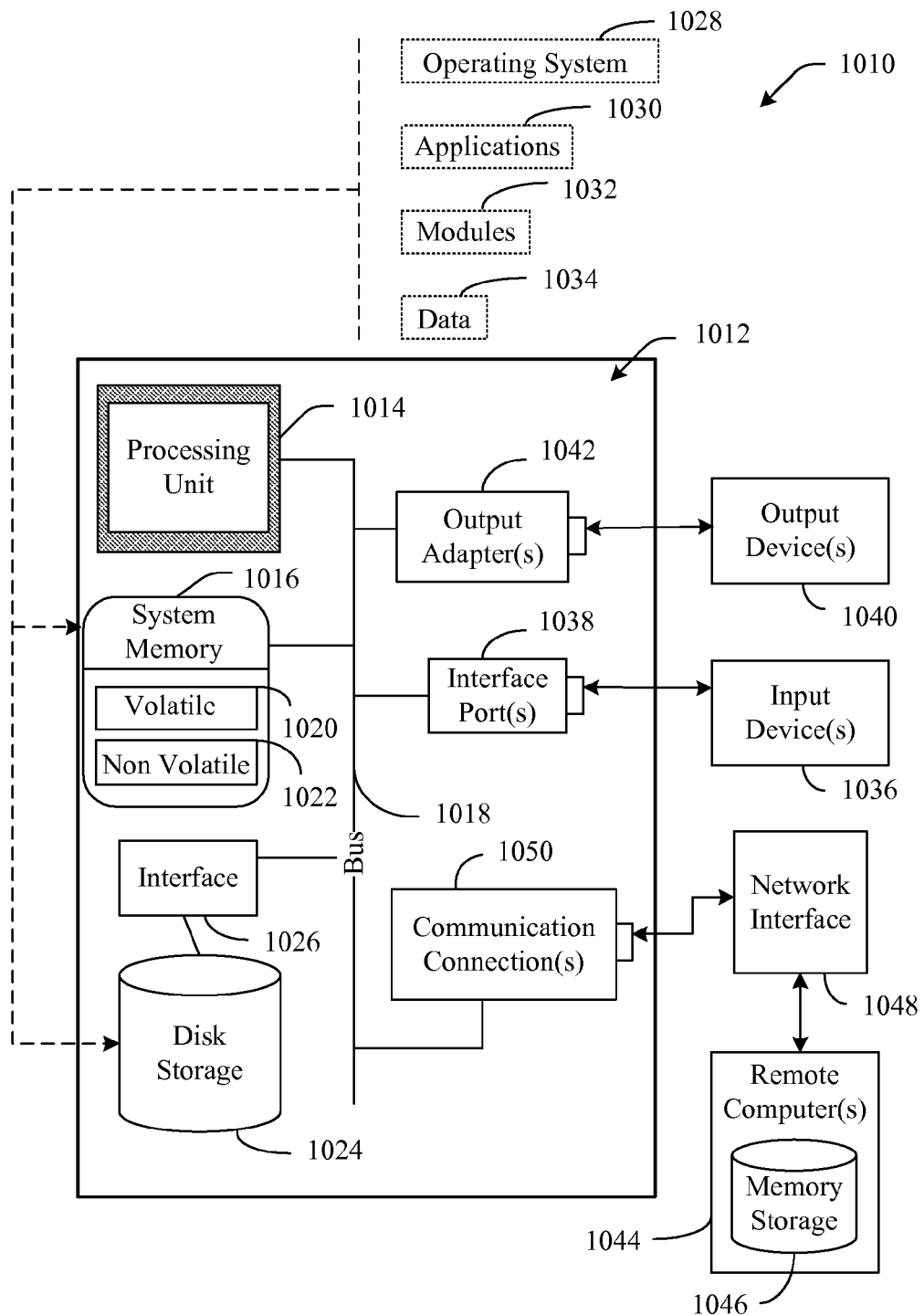
FIG. 10 illustrates an exemplary operating environment for implementing various aspects of the subject innovation.
Figure 11:
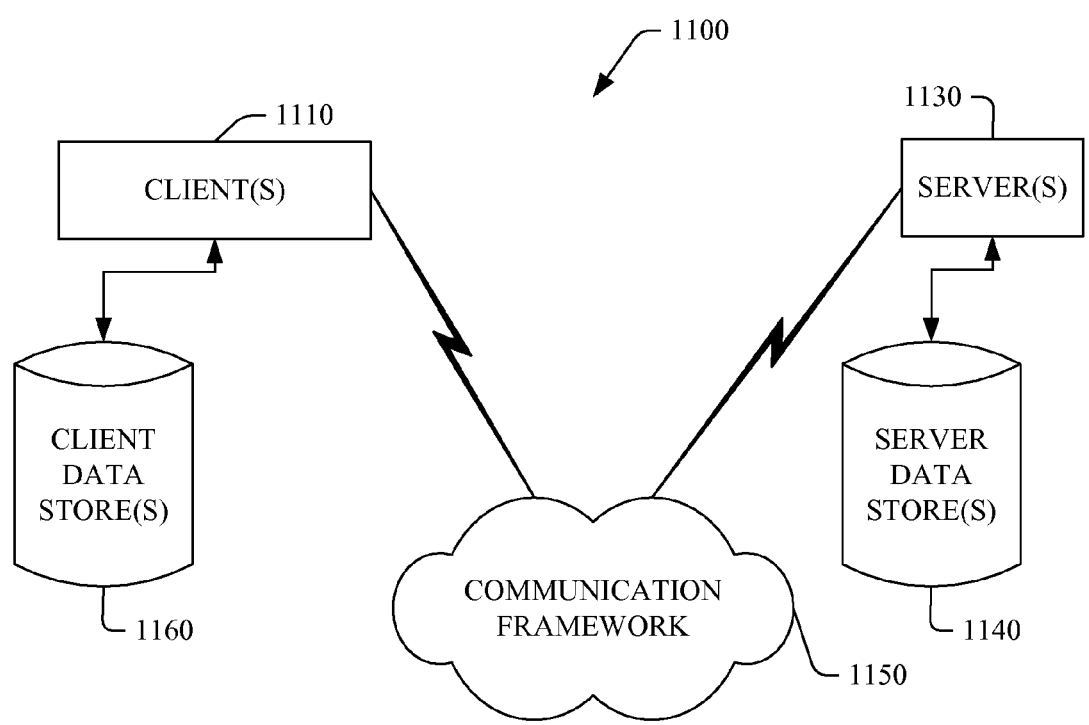
FIG. 11 illustrates a schematic block diagram of a sample computing environment with which the subject innovation can interact.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, etc. that perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and widearea networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed for analyzing aggregated tagging behavior of users. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g. threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising the following computer executable components:
   an Application Programming Interface (API) that frontloads activities of a Graphical Processing Unit (GPU) represented by a graphics pipeline;
   a view component as part of the API to inform a runtime driver regarding resource management of the GPU; and
   the graphics pipeline configurable by the API.

2. The computer implemented system of claim 1, the resource management includes structural sub-setting of data objects for activities frontloaded from set time to a creation time.

3. A computer implemented system comprising the following computer executable components:
   an Application Programming Interface (API) that frontloads activities of a Graphical Processing Unit (GPU) represented by a graphics pipeline, wherein the API further comprises a state object component that creates immutable objects upfront and from set time to creation time, during processing in the GPU, and
   the graphics pipeline configurable by the API.

4. A computer implemented system comprising the following computer executable components:
   an Application Programming Interface (API) that frontloads activities of a Graphical Processing Unit (GPU) represented by a graphics pipeline, wherein the API further comprises a linking component that supplies a bind by position schema for GPU processing; and
   the graphics pipeline configurable by the API.

5. The computer implemented of claim 4 further comprising a signature arrangement that designates a structure definition for register arrays of the GPU.

6. A computer implemented system comprising the following computer executable components:
   an Application Programming Interface (API) that frontloads activities of a Graphical Processing Unit (GPU) represented by a graphics pipeline, wherein the API further comprises a hazard detection component that reduces potentially invalid states that occur within a graphics pipeline; and
   the graphics pipeline configurable by the API.

7. The computer implemented system of claim 6, the hazard detection component further comprises a numbering arrangement that increases every time a resource of the GPU is bound as an output.

8. A computer implemented system comprising the following computer executable components:
   an Application Programming Interface (API) that frontloads activities of a Graphical Processing Unit (GPU) represented by a graphics pipeline, wherein the API further comprises a layering arrangement that provides device-wide functionality; and
   the graphics pipeline configurable by the API.

9. The computer implemented system of claim 8, the layering arrangement includes a core layer that transforms the API to a Display Driver Interface (DDI) that interacts with the driver.

10. The computer implemented system of claim 9 further comprising a debug layer that is positioned between the core layer and the API, to move validation from run-time to development time and identify application errors.

11. The computer implemented system of claim 9 further comprising handles and pointers for identification of data that the API manages for a driver.

12. A computer implemented method comprising the following computer executable acts:
    front loading activities via an API from a bind time to a creation time of a GPU processing; and
    designating system resources associated with the GPU processing at the creation time.

13. The computer implemented method of claim 12 further comprising employing a view component to describe memory layout.

14. The computer implemented method of claim 13 further comprising representing an abstraction that informs runtime and driver regarding resource management.

15. The computer implemented method of claim 14 further comprising representing the view as abstraction for binding.

16. The computer implemented method of claim 15 further comprising informing run time of associated driver regarding resource management.

17. The computer implemented method of claim 16 further comprising unbinding an object from graphics pipeline when a reference count reaches zero.

18. The computer implemented method of claim 17 further comprising destroying the object.

19. A computer implemented system comprising the following computer executable components:
 means for frontloading activities of a GPU processing from a set time to a bind time; and
 means for informing runtime of driver regarding resource management of the GPU processing.

* * * * *

UNITED STATES PATENT AND TRADEMARK OFFICE
CERTIFICATE OF CORRECTION

PATENT NO. : 7,659,901 B2 Page 1 of 1
APPLICATION NO. : 11/565326
DATED : February 9, 2010
INVENTOR(S) : Toelle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 567 days.

Signed and Sealed this

Thirtieth Day of November, 2010

David J. Kappos
*Director of the United States Patent and Trademark Office*